United States Patent

[11] 3,567,160

| [72] | Inventors | Earl G. Adams<br>2130 N.W. 13th St., Fla. 33125;<br>Edmund L. Eveleth, 10901 S.W. 180th St.,<br>Miami, Fla. 33157 |
|---|---|---|
| [21] | Appl. No. | 813,253 |
| [22] | Filed | Apr. 3, 1969 |
| [45] | Patented | Mar. 2, 1971<br>Continuation-in-part of application Ser. No. 656,533, July 27, 1967, Patent No. 3,497,167. |

[54] AIRCRAFT WEATHERVANING DEVICE
6 Claims, 6 Drawing Figs.

[52] U.S. Cl. .................................................... 244/115
[51] Int. Cl. ..................................................... B64f 1/12
[50] Field of Search ........................................ 244/114, 17.17; 244/115, 116

[56] References Cited
UNITED STATES PATENTS
2,415,071  2/1947  Brie ............................ 244/115
2,483,078  9/1949  Williams ..................... 244/115

FOREIGN PATENTS
259,324  10/1926  Great Britain ................ 244/115
280,332  11/1927  Great Britain ................ 244/115

*Primary Examiner*—Milton Buchler
*Assistant Examiner*—Paul E. Sauberer
*Attorney*—Ernest H. Schmidt ABSTRACT: An aircraft weathervaning device having a supporting framework rotatably journaled with respect to a fixed cylinder and movable axially between a first position against the ground, whereat the aircraft is moved into place and secured, and a second position a few inches above the ground whereat the supporting framework, together with the aircraft, is free to turn in weathervane fashion always to face into the wind. The supporting framework is in the form of a T-bar having adjustable arms terminating in wheel pads adapted to receive and have lashed thereto the wheels of a tricycle landing gear. The T-bar supporting framework can readily be modified into an H-bar configuration for supporting a circular deck to accommodate movable wing aircraft.

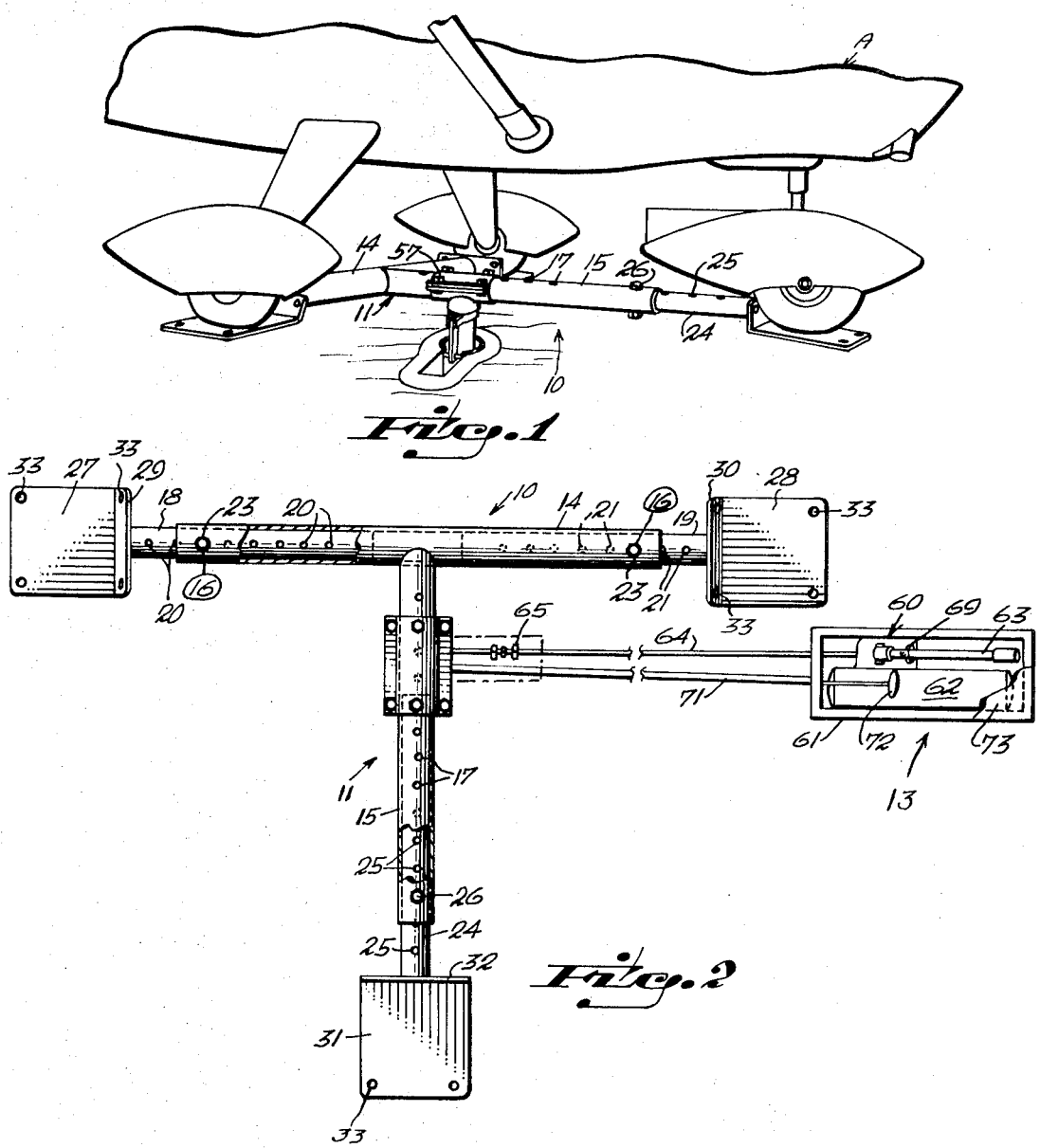

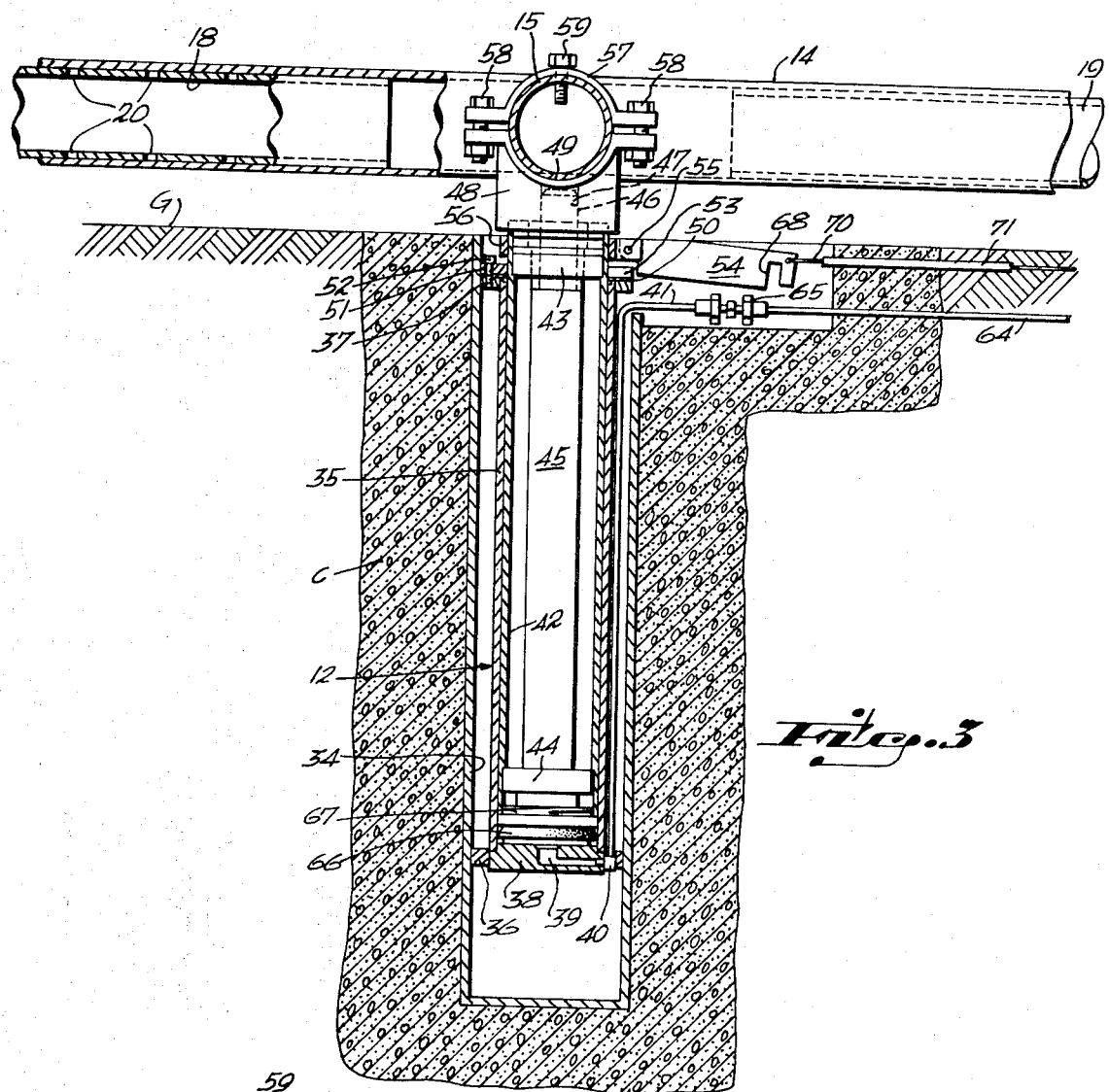

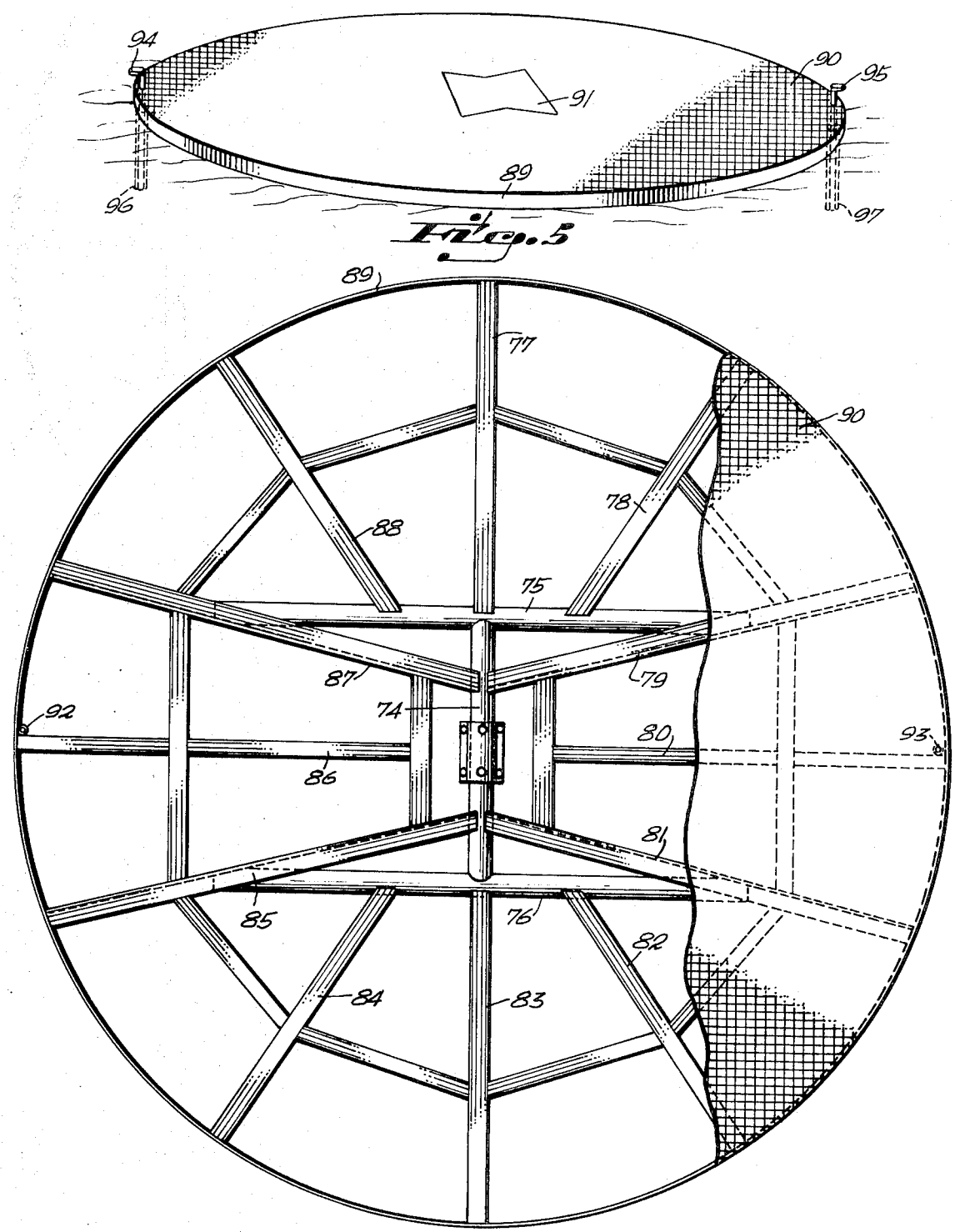

AIRCRAFT WEATHERVANING DEVICE

This application is a continuation-in-part of application Ser. No. 656,533, filed Jul. 27, 1967, now U.S. Pat. No. 3,497,167. In our U.S. Pat. application Ser. No. 656,533, filed Jul. 27, 1967, and entitled EXTENSIBLE ROTATABLE SUPPORT FOR AIRCRAFT, there is illustrated and described a supporting structure rotatable about a vertical axis for receiving an aircraft to be parked and operative to raise the aircraft, once placed and secured thereon, a few inches above the ground to permit its weathervaning under the influence of the prevailing winds, thereby minimizing the possibility of wind damage to the aircraft. The present invention is directed to improvements therein resulting in better performance, better structural rigidity and decrease of costs of manufacture.

It is well known that high winds accompanying thunderstorms, squalls, hurricanes and the like severe weather conditions cause substantial damage to all classes of aircraft that are tied down in the open. Thus, although tied-down aircraft headed into the wind are well adapted to withstand high wind velocities, they are at the same time extremely vulnerable and susceptible to damage by winds of substantially lesser velocities, whether in the form of gusts or sustained blows, coming from directions other than head on. Since in many instances there is little or no warning of changes in wind direction of sufficient strength to be damaging, fixed position tiedown as commonly practiced is risky and for this reason the cost of obtaining insurance protection against wind damage is high, in many cases, prohibitively high.

The invention of the above-identified patent application, of which the present invention is a continuation-in-part, resides in the provision of a rotatable weathervaning supporting device for parked aircraft wherein the supported aircraft will automatically weathervane, i. e., continuously rotate to a position whereat it is headed into the wind, thereby always maintaining a position least likely to result in damage even under the most severe conditions of wind velocity such as might occur, for example, during a hurricane. The present invention has, for its principal object, the provision of an aircraft weathervaning device of the above nature which will be comparatively low in profile and therefore present less of an obstruction or hazard to taxiing aircraft in the vicinity of the device and which, at the same time, will be comparatively simple in structure and economical in cost.

A more particular object of the invention is to provide an aircraft weathervaning device of the above nature the supporting framework of which is in the form of a T-bar having extensibly adjustable arms for adaptation to use with a wide range of dimensions of breadth and length of tricycle landing gear, and the outer ends of which are provided with wheel pads for the placement and securement of the gear wheels, and including mechanism for remotely elevating the framework on a central pivotal shaft rotatably supported in a sleeve fixed in the ground.

Still another object is to provide an aircraft weathervaning device wherein the T-bar supporting framework is of such structure as to be readily modified into H-bar formation providing support for a circular deck suitable for landing and securement thereto of rotary wing aircraft.

Yet another object is to provide an aircraft weathervaning device of the character described including remote controlled hydraulic mechanism for actuating the lifting mechanism, and including lock means for locking the framework in elevated weathervaning position.

Other objects, features and advantages of the invention will be apparent from the following description when read with reference to the accompanying drawings. In the drawings, wherein like reference numerals denote corresponding parts throughout the several views:

FIG. 1 illustrates in perspective an aircraft weathervaning device embodying the invention, shown in use;

FIG. 2 is a plan view as seen from above of the aircraft weathervaning device, shown separately;

FIG. 3 is a vertical cross-sectional view illustrating details of the elevating mechanism;

FIG. 4 is a partial vertical cross-sectional view similar to FIG. 3 but showing the T-bar framework locked in its elevated position;

FIG. 5 illustrates, in oblique view, a modification of the invention utilizing a circular deck for parking rotary wing aircraft; and FIG. 6 is a plan view of the circular deck supporting framework, shown separately, of the embodiment of the invention shown in FIG. 5.

Referring now in detail to the drawings, and considering the first form of the invention as illustrated in FIGS. 1 through 4, the numeral 10 designates, generally, an aircraft weathervaning device for light aircraft having tricycle landing gear, shown in use in FIG. 1 with an aircraft A, partially illustrated. The aircraft weathervaning device 10 comprises, generally, a T-bar frame assembly 11, a rotary support and elevating master assembly 12 and a remote control assembly 13.

Referring now to FIG. 2, it will be seen that the T-bar frame assembly 11 comprises a crosstube 14 and a base tube 15, both preferrably of strong steel, one end of said base tube being welded perpendicularly to said crosstube at a central position therealong. The crosstube 14 is provided, near each end, with vertically-extending through openings 16, hidden by throughbolts 23, for the purpose hereinafter appearing. The base tube 15 is provided along its length with a plurality of vertically-extending, equidistantly-spaced through openings 17. Pad tubes 18, 19, also preferably of strong steel, are telescopingly received within the ends of the crosstube 14, and are provided along their length with pluralities of equidistantly-spaced, vertically-extending through openings 20, 21, respectively, by means of which they may be adjustably secured to said crosstube as by the bolts 23. Similarly, a pad tube 24 is telescopingly received within the outer end of base tube 15, and is provided along its length with a plurality of equidistantly-spaced, vertically-extending through openings 25, by means of which it can be adjustably secured to said base tube by a bolt 26. The spacing between the through openings 25 in the pad tube 24 is the same as that between the openings 17 in the base tube 15, for the purpose hereinafter appearing.

The outer ends of the cross pad tubes 18, 19 have welded or otherwise affixed thereto rectangular, flat wheel pads 27, 28, respectively, preferably of steel plate, the inner ends of said pads being formed with upstanding end portions 29, 30, respectively, defining obtuse angles with respect to their respective pad upper surface portions. The outer end of the base pad tube 24 has welded or otherwise affixed thereto a flat pad 31, also of steel plate, said pad having a vertically-upstanding inner end portion 32 against which said tube is affixed. The wheel pads 27, 28 and 31 are each provided with openings 33 in the respective corners thereof, through which tie chains or ropes may be threaded when lashing the wheels of a tricycle landing gear in place. It will be understood that the pad tubes 18, 19 and 24 will be adjustably secured in place by their respective bolts 23 and 26 to accommodate the spacing, both lateral and longitudinal, between the wheels, and the range of adjustment is such as to fit all aircraft within the size limitations for which the weathervaning device is designed.

With more particular reference now to FIGS. 3 and 4, it will be seen that the rotary support and elevating master assembly 12, in use, is embedded in the ground, with the upper end substantially at ground level as indicated at G in FIG. 3. Preferrably, an oversized opening will be prepared in the ground, and the assembly will be encased in poured concrete, as indicated at C. The master assembly 12 comprises a cylindrical outer housing 34 fitted within which is a cylinder 35 of somewhat reduced diameter secured in spaced relation therein by means of a lower spacer ring 36 and an upper annular flange 37, said ring and said flange being secured, as by welding, to upper and lower end portions of said cylinder. The lower end of the cylinder 35 is sealed off by means of a lower end plate 38 provided with an opening 39 communicating between the inside thereof and an outer wall portion whereat it communicates with a fitting 40 for connection with a hydraulic line 41 for feeding hydraulic fluid under pressure.

Slidingly received within the fixed cylinder 35 is a tubular piston 42 having reduced-diameter end wall portions within which are press-fitted upper and lower thrust-bearing 43, 44, respectively, journaling a central pivot rod 45. The pivot rod 45 has a reduced-diameter upper end portion 46 received and secured as by welding in a vertical opening 47 in the underside of a saddle-member 48, which saddle member is formed along its top with a longitudinally-extending, semicylindrical recess 49 for seating therein and assembly thereto of the T-bar frame assembly 11, as is hereinafter more particularly described.

As means for sealing off the upper end of the fixed cylinder 35, with respect to leakage of hydraulic fluid, an O-ring retaining gasket 50 is seated on the upper annular flange 37 and secured in place in sliding friction contact with respect to the tubular piston 42 by means of a gasket retainer ring 51 secured in place as by bolts 52. The gasket retainer ring is provided at one side with an opening 53 for passage of a lock-bar 54 pivotally linked, as by a pivot pin 55, to a collar 56 secured with respect to the upper end of the tubular piston 42.

As illustrated in FIGS. 1 and 2, the T-bar frame assembly 11 is secured with respect the rotary support and elevating master assembly 12 by having its base tube 15 seated within the saddle member 48 and secured thereto by a complementary flanged yoke member or cap 57 bolted in place by bolts 58. Indexing pins or bolts 59 extending through central openings in the yoke member 57 into selected pairs of openings 17 and 25 along the base tube 15 and its associated pad tube 24 serve not only to adjustably fix the position whereat the T-bar frame assembly 12 is secured to the rotary support and elevating master assembly to best accommodate the vertical center of gravity of any particular aircraft for which the device is to be used, but also serves to inhibit any possibility of axial rotation of said base tube.

Remote control means is provided for raising the tubular piston 42 and its associated T-bar frame assembly 11 once an airplane has been rolled into position and secured in place on the wheel pads as described above and as illustrated in FIG. 1. To this end, as illustrated in FIGS. 2 and 3, a manually-operated hydraulic jack 60 is provided, being placed in a suitable enclosure 61 in the ground at a distance from the axis of rotation of the T-bar frame assembly 11 beyond the wing extent of any aircraft that might be used with the device. The hydraulic jack 60 may be of known construction including a reservoir tank 62 for the hydraulic fluid contained in a sealed system and a pump-actuating handle 63. The outlet orifice of the hydraulic jack unit connects, through an underground fluid-pressure line 64 and connector union 65, to the hydraulic line 41. In operation, it will be understood that when the pump-actuating handle 63 is reciprocated, fluid under pressure will be transferred through hydraulic lines 64 and 41 to the lower end of the fixed cylinder 35, whereat it exerts pressure against the underside of a resilient cup washer 66 and a screwed-in-place end cap 67 at the lower end of the tubular piston 42 to raise said piston. When the cylinder has been raised to operating position, the lock-bar 54, as illustrated in FIG. 4, will have fallen into locking position, whereat the slot 68 in said lock-bar will engage with the upper annular flange 37 of the fixed cylinder 35, thereby preventing any further upward or downward movement of the piston 42 while the device is in use. It will also be noted that the lock-bar 54, when in its locking position, as illustrated in FIG. 4, is received within the opening 53 in the gasket retainer ring 51, thereby preventing any possible rotation of the piston 42 with respect to the fixed cylinder 35. It will thus be understood that weathervaning rotation of the T-bar frame assembly 11 takes place only by virtue of the associated pivot rod 45 being journaled in the thrust bearings 43 and 44.

After the T-bar frame assembly 11 is hydraulically raised and locked in place as described above, the pressure relief valve, indicated at 69 in FIG. 2, will be opened to minimize the possibility of leakage in the fluid system. When it is desired to lower the aircraft, the relief valve 69 will first be closed, and the pump-actuating handle 63 will be operated sufficiently to relieve the lock-bar 54, after which said lock bar can be removed from locking position by means of a control wire 70 connected thereto at one end and extending underground through a protective tube 71 into the enclosure 61, a pull knob 72 being provided for this purpose. After the lock-bar 54 has been disengaged, the relief valve 69 will be opened again to allow the weight of the aircraft to force the hydraulic fluid back into the reservoir 62 and thereby lower itself to ground position. As partially illustrated in FIG. 2, a cover plate 73 is preferably provided for covering the enclosure 61 when the hydraulic system is not being actuated.

FIGS. 5 and 6 illustrate a modification of the invention utilizing a circular deck for weathervaning parking of rotary wing aircraft. As illustrated in FIG. 6, instead of a T-bar assembly 11 as described above in the embodiment of the invention illustrated in FIGS. 1 through 4, an H-bar configuration is utilized, comprising a crosstube 74 and spaced, parallel end tubes 75, 76, said crosstube being centrally affixed with respect to a rotary support and elevating master assembly (not illustrated) the same as that described in the first embodiment of the invention. Welded to the H-frame assembly comprising the crosstube 74 and end tubes 75 and 76, in substantially a common plane therewith, are a plurality of radially-extending support members 77 through 88 which may be of angle iron cross-sectional configuration. The outer ends of the radially-extending support members 77 through 88 define the periphery of a circle whose center is coincident with the axis of rotation of the framework, and said ends are joined by a welded-in-place circular rim 89. The top of the framework has welded or otherwise secured thereupon a circular deck 90, which may be of expanded metal or the like to provide a uniformity of openings over its entire surface, through which tie ropes can be threaded for lashing the wheels or skids of an aircraft in place. As illustrated in FIG. 5, the deck 90 is cut to provide a removable central access plate 91.

Lock means is provided to prevent rotation of the device upon landing or takeoff of aircraft. To this end, diametrically opposite end portions of the turntable framework are provided with sleeves 92, 93 (see FIG. 6) through which lock rods 94, 95 can be vertically inserted to pass into lock tubes 96, 97 embedded in the ground and appropriately placed for this purpose. Preferably, the upper ends of the lock rods 94, 95 will be of such size and/or of such contrasting color as to be readily visible by a pilot coming in for a landing, to minimize the possibility of a landing on the device while in its free-turning condition.

While we have illustrated and described herein only two forms in which our invention can conveniently be embodied in practice, it is to be understood that these forms are given by way of example only, and not in a limiting sense. For example, although the invention is illustrated and described herein for use with aircraft having tricycle landing gear, it will be understood that it can also readily be converted for use with aircraft having a tail skid or tail wheel simply by utilizing an extension bolted to the rear wheel pad 31 and of sufficient length and height to support the skid or tail wheel at its outer end. The invention, in brief, comprises all the embodiments and limitations coming within the scope and spirit of the following claims.

We claim:

1. An aircraft weathervaning device comprising an aircraft supporting framework, mechanism for raising and lowering said supporting framework between a first position at ground level and a second position a few inches above ground level, said raising and lowering mechanism comprising antifriction journal means journaling said framework for rotation in a horizontal plane, said framework comprising a crossmember and a base member, said crossmember being fixed at one end perpendicularly to said base member at a central position therealong to present a T-bar frame configuration, manually operated remote control means for actuating said raising and lowering mechanism at a position beyond the extend of the wings or other distal end portions of an aircraft supported by said framework, said cross member and said base member both being of tubular form, the other ends of said crosstube and the outer end of said base tube each having telescopingly received therein individual pad tubes each having affixed thereto a pad plate for the seating thereon of tricycle landing gear wheels, and means for adjustably receiving said pad tubes as to their in and out positions in their respective base and crosstubes to provide for accommodation to a wide range of variation in breadth and length of spacing between aircraft tricycle landing gear wheels.

2. An aircraft weathervaning device as defined in claim 1 wherein said raising and lowering mechanism comprises a hydraulic piston and wherein said remote control actuating means comprises a hydraulic pump, a relatively fixed cylinder, said piston being slidably arranged in said relatively fixed cylinder, and a hydraulic line communicating between said hydraulic pump and said cylinder.

3. An aircraft weathervaning device as defined in claim 2 wherein said antifriction journal means comprises a pivot rod axially rotatable in said cylinder, and means for adjustably securing the upper end of said pivot rod along said base tube.

4. An aircraft weathervaning device as defined in claim 3 wherein said pivot rod securing means comprises a saddle member fixed to said pivot rod and having a semicylindrical recess for seating said base tube, a cap member, and means for bolting said cap member to said saddle member for clamping said base tube in adjusted position therebetween.

5. An aircraft weathervaning device as defined in claim 3 including lock means for mechanically locking said piston in raised position to relieve back pressure on said hydraulic pump.

6. An aircraft weathervaning device as defined in claim 5 wherein said lock means comprises a lock bar pivotally linked at one end to said piston and operative to fall into hooking engagement with said cylinder, and a flexible cable connected to the free end of said lock bar for its remote actuation in unlocking.